US007959330B2

(12) United States Patent
Hashimoto et al.

(10) Patent No.: US 7,959,330 B2
(45) Date of Patent: Jun. 14, 2011

(54) POWER LED LIGHTING ASSEMBLY

(76) Inventors: Yasuki Hashimoto, New York, NY (US); Akimitsu Tanaka, Kita-ku (JP)

( * ) Notice: Subject to any disclaimer, the term of this patent is extended or adjusted under 35 U.S.C. 154(b) by 15 days.

(21) Appl. No.: 11/891,696

(22) Filed: Aug. 13, 2007

(65) Prior Publication Data

US 2009/0046465 A1 Feb. 19, 2009

(51) Int. Cl.
*B60Q 1/06* (2006.01)

(52) U.S. Cl. ........................................ 362/373; 362/294

(58) Field of Classification Search .................. 362/294, 362/373, 218, 249.02, 249.05, 249.07, 276; 361/679.47
See application file for complete search history.

(56) References Cited

U.S. PATENT DOCUMENTS

| | | | | | |
|---|---|---|---|---|---|
| 4,630,182 | A | * | 12/1986 | Moroi et al. | 362/294 |
| 5,806,965 | A | * | 9/1998 | Deese | 362/249.04 |
| 6,004,010 | A | * | 12/1999 | Inage et al. | 362/294 |
| 2003/0021105 | A1 | * | 1/2003 | Cramer et al. | 362/105 |
| 2004/0208009 | A1 | * | 10/2004 | Mardon et al. | 362/373 |
| 2005/0128752 | A1 | * | 6/2005 | Ewington et al. | 362/294 |
| 2006/0193139 | A1 | * | 8/2006 | Sun et al. | 362/373 |
| 2006/0232984 | A1 | * | 10/2006 | Schuknecht et al. | 362/373 |
| 2007/0076431 | A1 | * | 4/2007 | Atarashi et al. | 362/613 |

* cited by examiner

*Primary Examiner* — Julie A Shallenberger
(74) *Attorney, Agent, or Firm* — Day Pitney LLP

(57) ABSTRACT

A power LED lighting assembly includes power LEDs (each 1 watt, for example) mounted on a small circuit board of aluminum. To promote air ventilation, the LED circuit board is provided with air openings to communicate with the heat sink. A heat sink enclosure for accommodating the heat sink is also provided with air openings to communicate with the surrounding atmosphere. A micro fan is fixed above the heat sink for forced air ventilation. A temperature sensor is also installed to sense abnormal temperature increases in the assembly to adjust or reduce the volume of light and protect LEDs against abnormally high temperature. The micro fan is turned on for heat release automatically on a temperature increase.

10 Claims, 10 Drawing Sheets

POWER LED LIGHTING ASSEMBLY

BACKGROUND OF THE INVENTION

This invention relates to a power LED (Light Emitting Diode) lighting assembly, and more particularly to a power LED lighting assembly with a forced air cooling device.

Power LED lighting assemblies are used for illumination of merchandise in jewelry shops or brand bag shops or the like. A power LED generates a high volume of heat during operation so that a heat sink may generally be required to maintain the quality of performance and working life of the power LED. Heat generation may be reduced to a minimum by reducing the number of LEDs used while a lens is used to maintain a proper level of illuminance. However, the use of the lens would resulting in changing warm light to cool light and thereby losing the intended effect of illumination by the LEDs.

In general, an LED which consumes 1 Watt of electricity per unit area is called "power LED" and is widely used when a very bright light source is needed. The power LED generates a high volume of heat so that a heat sink (for example, made of aluminum) should be installed for heat release. On the other hand, general purpose LEDs having power consumption on the order of 0.15 Watt do not require installation of a heat sink unless a high packing density is demanded. If such installation requirement is ignored, then the working life of the LEDs would become shorter and come to breakdown in the worst case.

Where high illumination is required as for some kinds of general purpose lighting fixtures, the number of LEDs should be increased with results in a high volume of heat. For this reason, a heat sink needed for heat release and maintenance of quality and operating life of LEDs would become bulky. To lower heat generation, the number of LEDs in actual use should be reduced, while a lens is used for maintaining illumination at an appropriate level. However, the use of such a lens would lead to changes in illumination color from warm to cool and damage to illumination performance.

SUMMARY OF THE INVENTION

It is an object of the present invention to provide to a power LED lighting assembly which provides high brightness illumination without changes in the expected color temperature and color performance of its power LEDs.

It is another object of the present invention to provide a compact power LED lighting assembly with a new built-in heat sink structure to meet the conflicting demands for an increase in the number of LEDs in use and for heat release from the heat sink structure.

BRIEF DESCRIPTION OF THE DRAWINGS

The features and advantages of the present invention will be more readily understood from the following detailed description when read in light of the accompanying drawings in which.

DETAILED DESCRIPTION OF EMBODIMENTS OF THE INVENTION

The present invention is designed to achieve implementations of high brightness lighting performance and functions without impairing LEDs intended color temperature and color performance. To achieve this objective, the present invention provides a compact LED lighting assembly with a new heat release structure which meets two requirements in direct conflict, that is, an increase in the number of LEDs used and no heat accumulation in a heat sink.

It is generally known in the art that there is a requirement of 2.5 square inch of heat sink area per 1 watt of power or per unit LED. On the other hand, if the number of LEDs used is reduced to control heat generation, then brightness will be limited. Even if a heat sink is installed but the temperature of heat released from the heat sink is substantially high, then materials (for example, shelves and ceilings) surrounding the lighting assembly will be subject to changes in shape, color, etc. To enhance brightness, lenses are used in many occasions to cause extremely high color temperature at a center of a front projection area of the lighting assembly with resultant uneven distribution of color temperature throughout the front projection area of the lighting assembly.

According to an embodiment of the present invention, six power LEDs (each 1 watt) are mounted on a small circuit board of aluminum. To promote air ventilation, the LED circuit board is provided with a plurality of air openings to communicate with the heat sink. Preferably, a heat sink enclosure for accommodating the heat sink is also provided with a plurality of air openings to communicate with the surrounding atmosphere. A micro fan is fixed above the heat sink for forced air ventilation. A temperature sensor is also installed to sense abnormal temperature increase in the assembly to adjust or reduce the volume of light and protect LEDs against abnormally high temperature. The micro fan is turned on for heat release automatically on a temperature increase.

Figure 1:
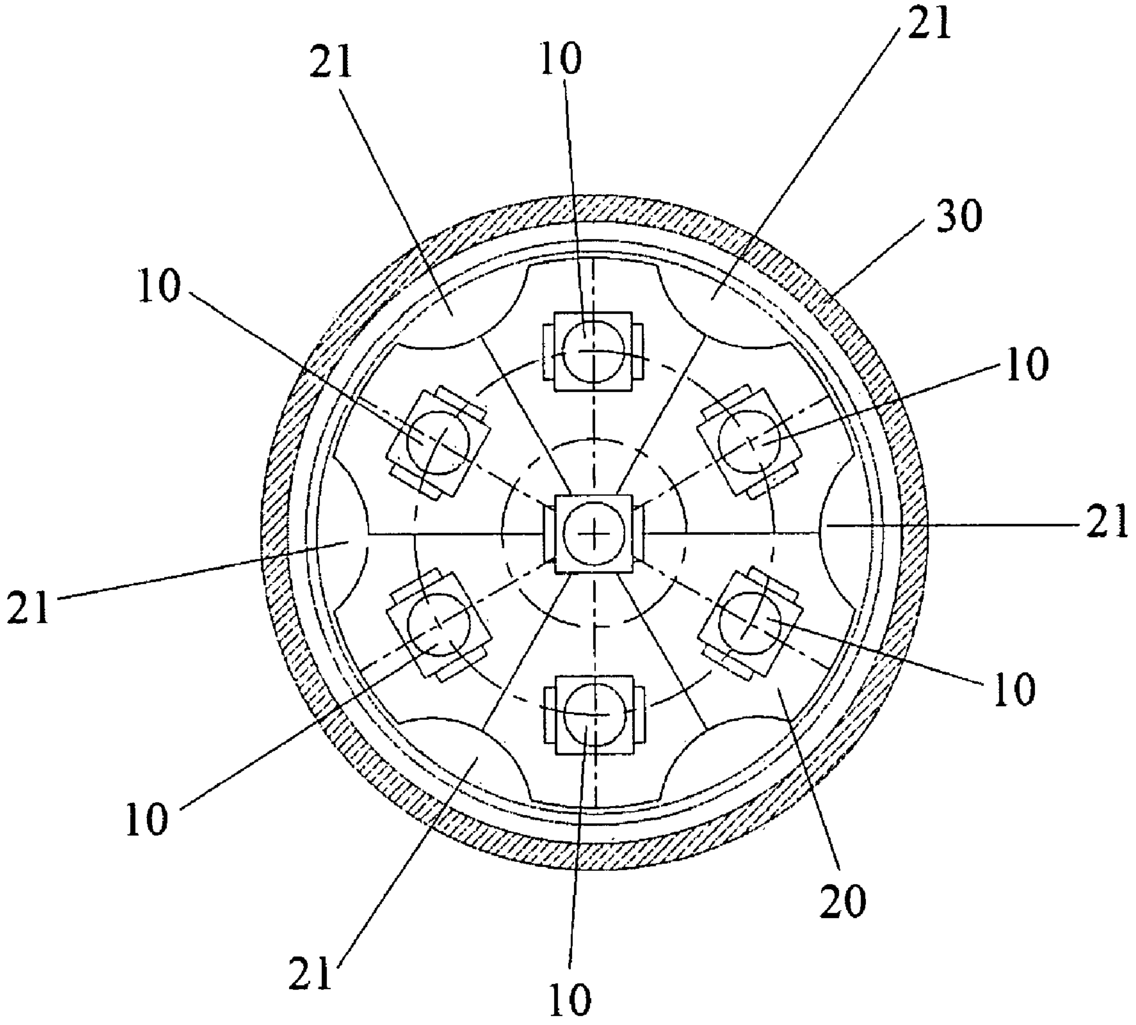
FIG. 1 is a front view of the power LED lighting assembly according to an embodiment of the present invention.

Referring now to the attached drawings, there will be described and illustrated some embodiments of the present invention. As shown in FIG. 1, for example, six power LEDs 10 (each 1 Watt) are mounted on an LED Power Circuit (PC) board 20 (e.g., aluminum board). The LED PC board 20 may be 1 mm thick. For release of heat from the power LEDs, the LED PC board 20 may be of high thermal conductivity material. At the periphery of the LED PC board 20 there are formed a corresponding number of through holes or cutouts 21 for forced air fan ventilation according to the present invention. The LED PC board 20 is secured within a heat sink cover 30.

Figure 2:
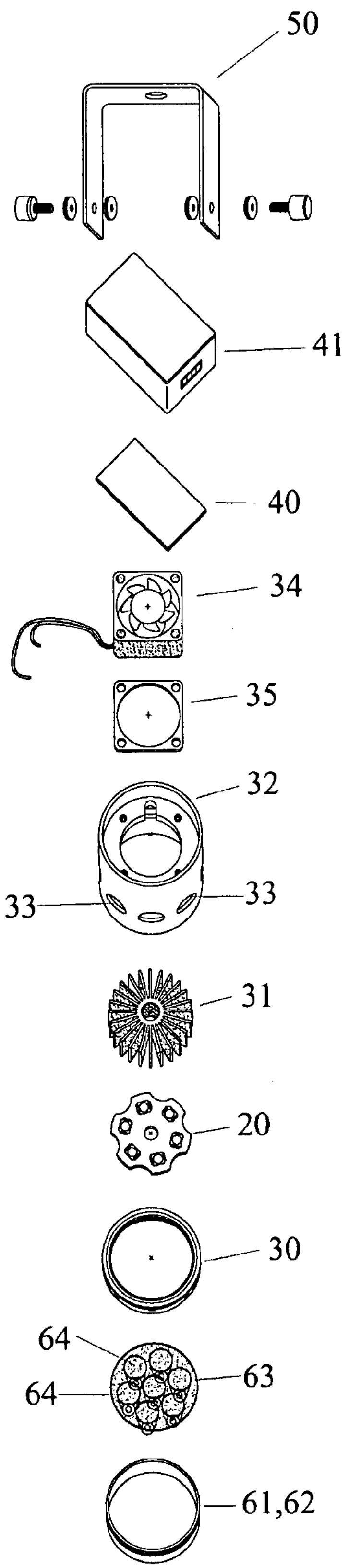
FIG. 2 is an exploded diagram showing individual parts of the power LED lighting assembly shown in FIG. 1.

FIG. 2 shows individual components of a power LED lighting assembly according to the illustrated embodiment of the present invention, in addition to the LEDs 10, the LED PC board 20, and the heat sink cover 30. There are further provided a heat sink 31 with a plurality of heat radiating fins to be housed within a heat sink enclosure 32. The heat sink enclosure 32 is formed with a plurality of air openings 33 at its periphery for air communication between the surrounding atmosphere and the heat sink 31. The heat sink 31 and the LED PC board 20 are accommodated between the heat sink enclosure 32 and the heat sink cover 30 so that the LED PC board is positioned in close proximity to the heat sink 31 for efficient heat release and cooling effects with help of the air openings 33 in the heat sink enclosure 32. A micro fan 34 is placed at a rear side of the heat sink enclosure 32 through a fan spacer 35 for forced air circulation and ventilation within the heat sink enclosure 32. The micro fan 34 of a very thin profile in the order of 20 mm is commercially available in the name of IC Fan® from Shicoh Engineering Co. Ltd., Japan.

Figure 3:
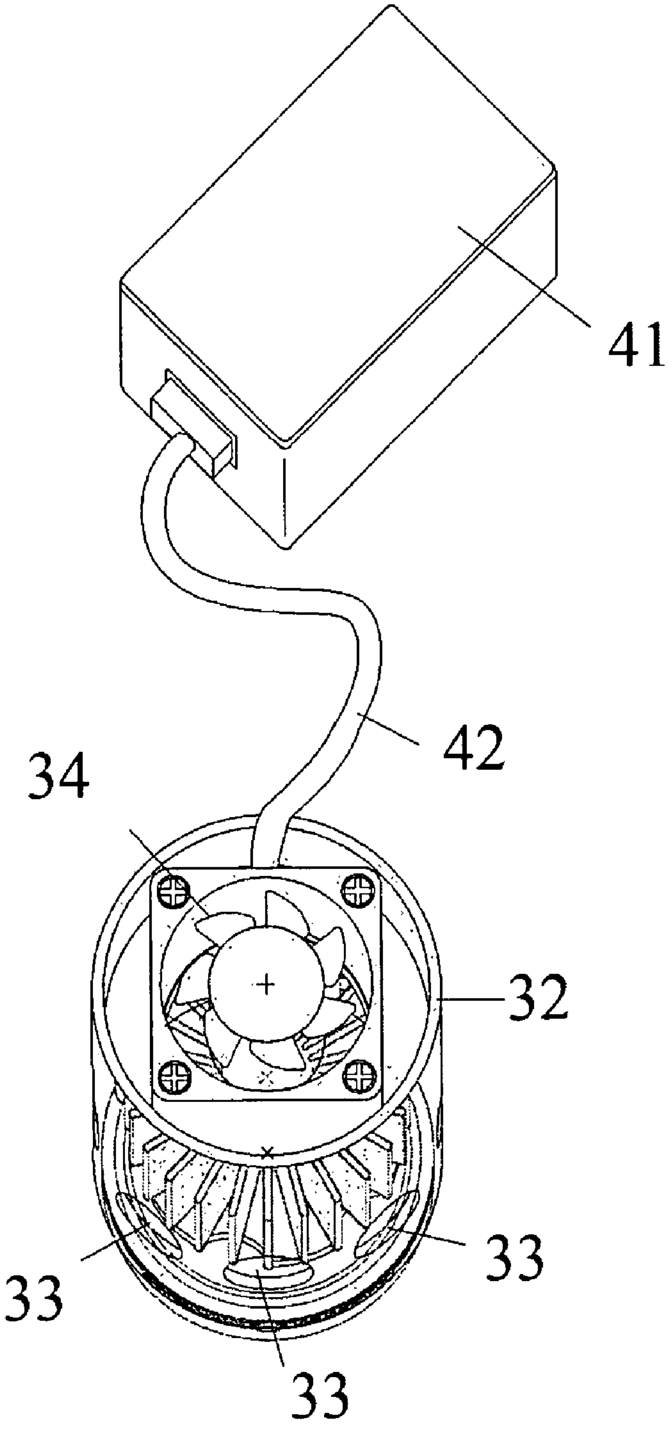
FIG. 3 is a perspective view showing the power LED lighting assembly with a driver box as shown in FIG. 1.
Figure 4B:
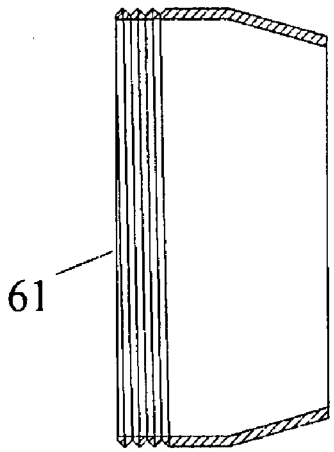
FIGS. 4(*a*), 4(*b*), 4(*c*) and 4(*d*) are a plan view and a cross sectional view of a snout cone and a plan view and a cross sectional view of a snout short.
Figure 4A:
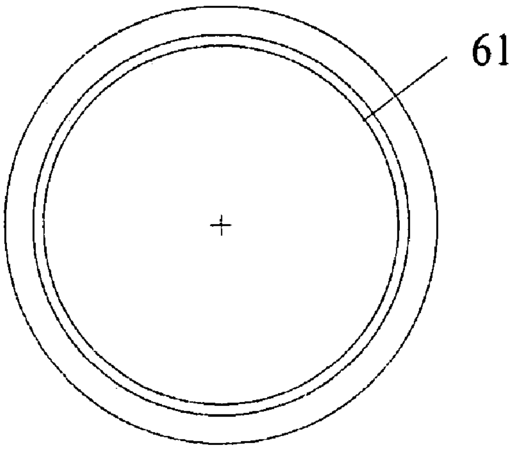
Figure 4D:
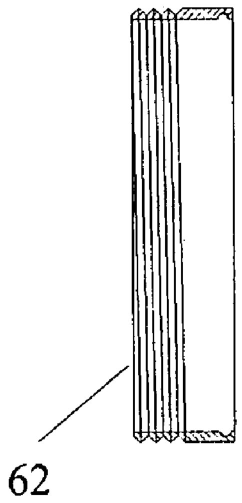
Figure 4C:
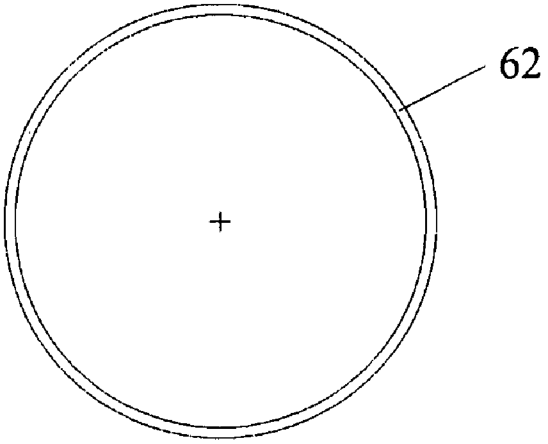

A driver board 40 carries a control circuit for enabling and controlling the LEDs 10 and the micro fan 34 through a connector 42 (FIG. 3). The control circuit includes a temperature sensor or a thermostat (not shown in the drawings) for protecting the LEDs 10 and the micro fan 34 against abnormal temperature rise In addition, the micro fan 34 may be connected to start ventilation operation automatically when the temperature of the power LED lighting assembly increases. The driver board 40 is housed in a driver box 41 which is separate from the heat sink enclosure 32. A fixture hinge 50 is used for fixing the power LED lighting assembly at a wall or ceiling.

At the front end of the heat sink enclosure 32 there is provided either a snout cone 61 or a snout short 62 for accommodating a lens plate 63 having a corresponding number of lenses 64 for focusing light emitting from the individual LEDs 10 on the LED PC board 20. Either the snout cone 61 or the snout short 62 is fitted into the front end of the heat sink enclosure 32.

Figure 5B:
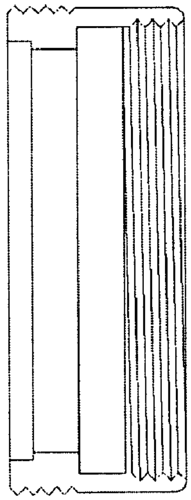
FIGS. 5(*a*) and 5(*b*) are a plan view and a cross sectional view of a heat sink cover.
Figure 5A:
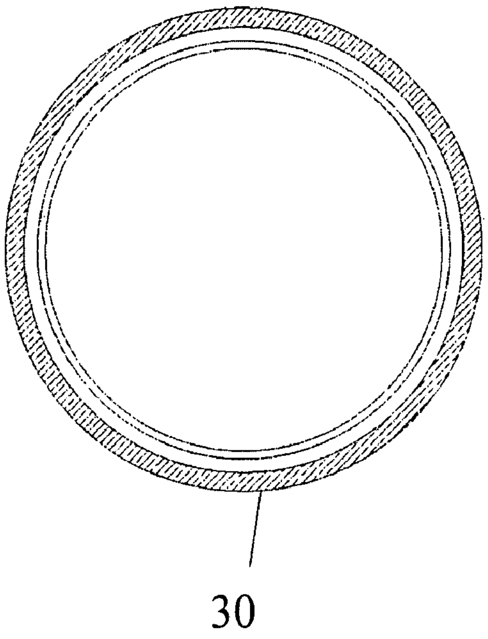
Figure 6B:
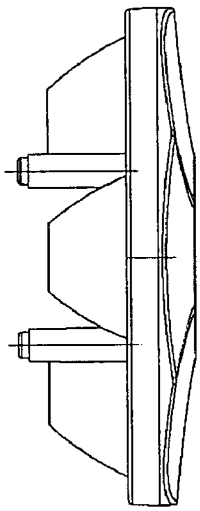
FIGS. 6(*a*) and 6(*b*) are a plan view and a side view of a focusing lens unit to be installed between the snout and the heat sink cover.
Figure 6A:
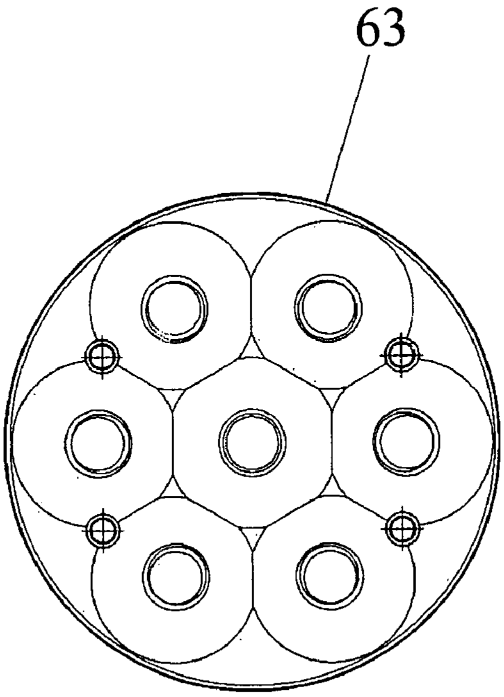
Figure 7:
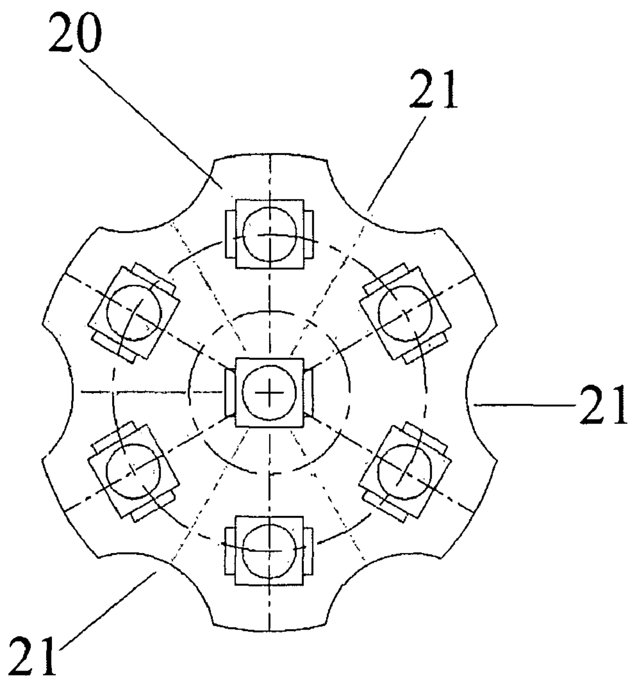
FIG. 7 is a plan view of a LED board having a plurality of LEDs mounted thereon.
Figure 8B:
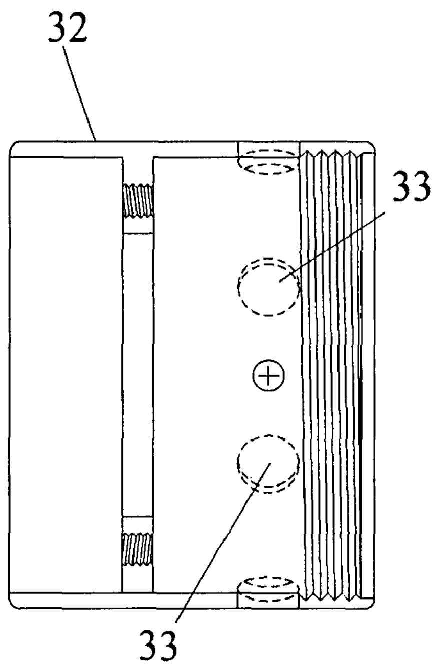
FIGS. 8(*a*) and 8(*b*) are a plan view and a cross-sectional view of a heat sink enclosure for accommodating the LED board and a heat sink.
Figure 8A:
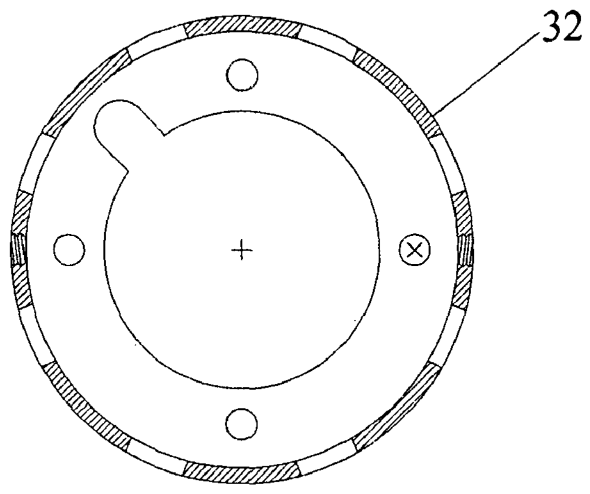
Figure 9B:
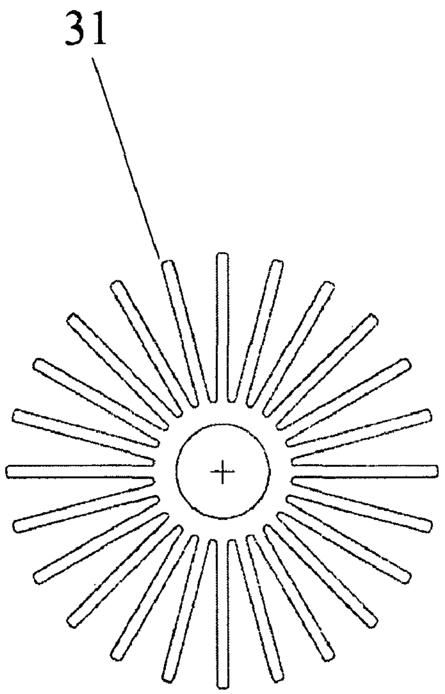
FIGS. 9(*a*) and 9(*b*) are a side view and a plan view of the heat sink.
Figure 9A:
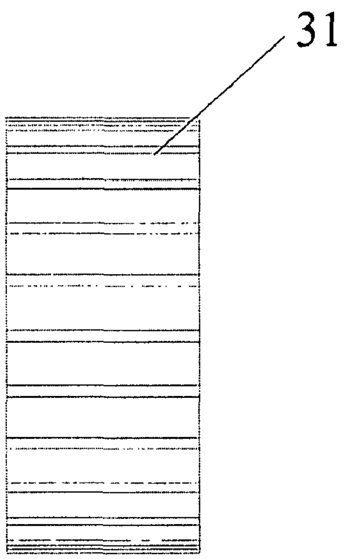
Figure 10:
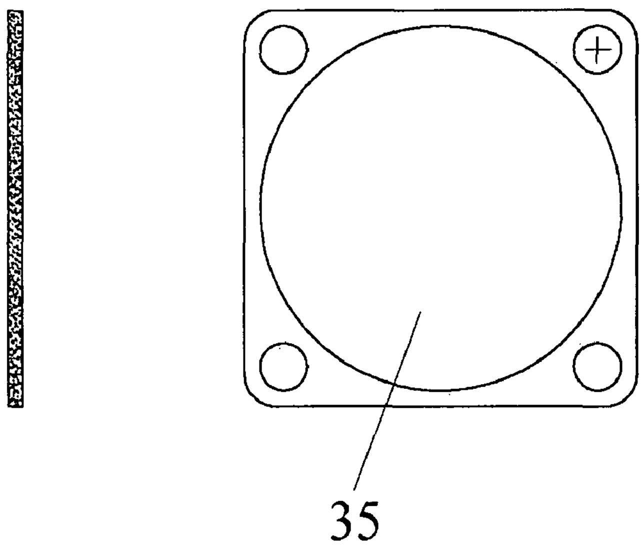
FIG. 10 is a plan view of a fan spacer.
Figure 11B:
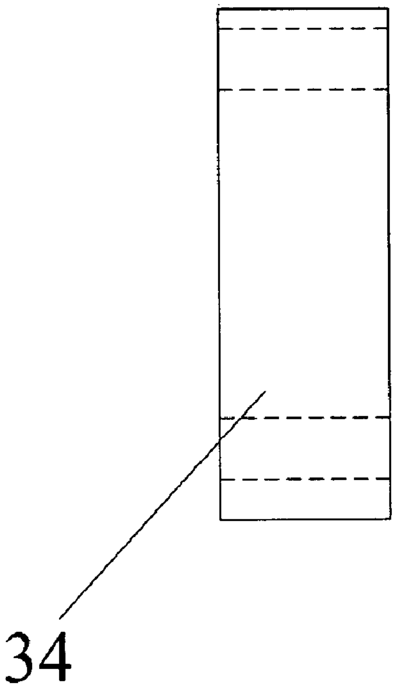
FIGS. 11(*a*) and 11(*b*) are a plan view and a side view of a micro fan for a fan ventilation system for the power LED lighting assembly.
Figure 11A:
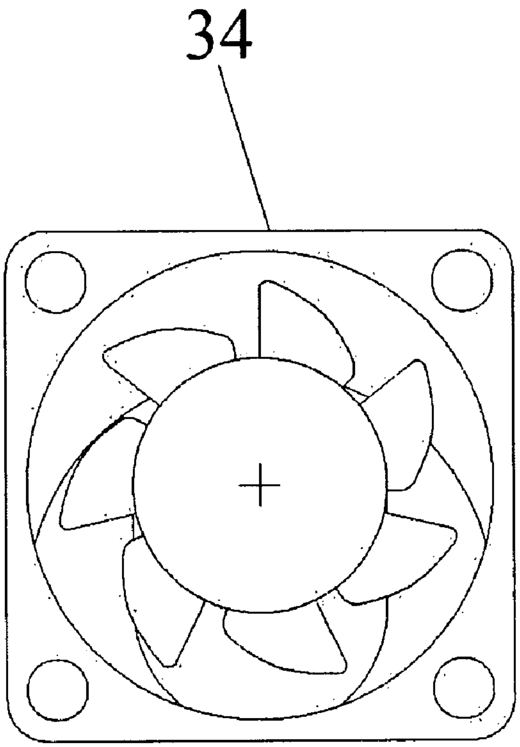

The heat sink enclosure 32 and the driver box 41 when assembled are illustrated in FIG. 3. The snout cone 61 is shown in plan view and cross sectional view, respectively, in FIGS. 4(*a*) and 4(*b*). The snout short 62 is also shown in plan view and cross sectional view, respectively, in FIGS. 4(*c*) and 4(*d*). The heat sink cover 30 is shown in plan view and cross sectional view, respectively, in FIGS. 5(*a*) and 5(*b*). The lens plate 63 is shown in plan view and side view, respectively, in FIGS. 6(*a*) and 6(*b*). The power LED PC board 20 having the six power LEDs and the six air openings 21, 21 between the neighboring ones of the power LEDs is shown in plan view of FIG. 7. The heat sink enclosure 32 having the air openings 33, 33 is shown in plan view and cross sectional view, respectively, in FIGS. 8(*a*) and 8(*b*). The heat sink 31 is shown in plan view and side view, respectively, in FIGS. 9(*a*) and 9(*b*). The fan spacer 35 is shown in plan view of FIG. 10. The micro fan 34 of extremely thin profile is shown in plan view and side view, respectively, in FIGS. 11(*a*) and 11(*b*). It is noted that the micro fan 34, the heat sink 31 and the LED PC board 20 are accommodated within the heat sink enclosure 32 to complete a fan ventilation system (FVS) or forced air ventilation system for the power LED lighting assembly.

Figure 12A:
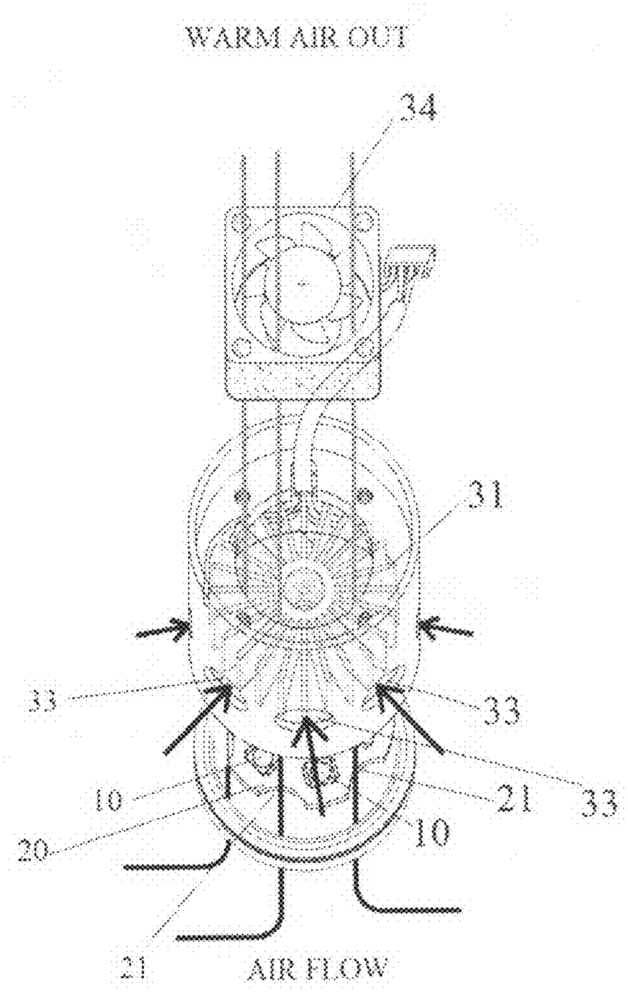
FIGS. 12(*a*), 12(*b*) and 12(*c*) are a perspective view, a side view and a front view of the fan ventilation system for showing air flows.
Figure 12B:
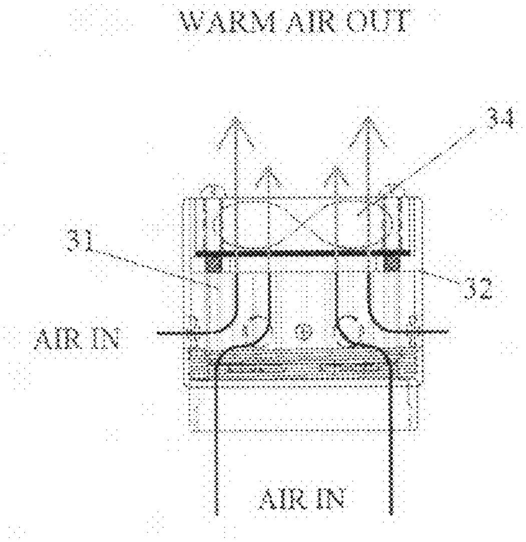
Figure 12C:
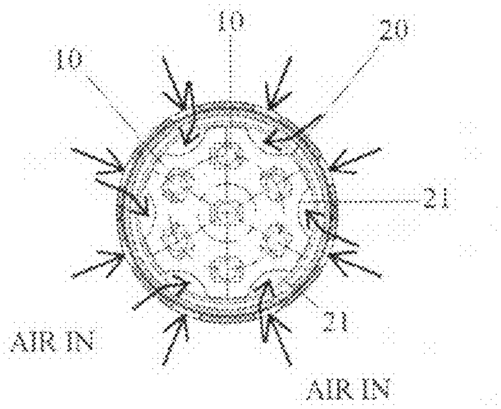

FIG. 12(*a*) shows an exploded perspective view of the FVS system for the power LED lighting assembly, FIG. 12(*b*) shows a cross sectional side view of the FVS system and FIG. 12(*c*) shows a front view of the FVS system. As shown by arrows in FIGS. 12(*a*) to 12(*c*), cool air is drawn from the surrounding atmosphere through the air openings 21 in the LED PC board 20 to travel around the power LEDs 10 on the LED PC board 20 while cooling down the power LEDs. Under this circumstance, heat generated from the power LEDs 10 is transferred through the heat sink 31 having an extended cross-sectional area for efficient heat release. Warm air is dispelled outside to the surrounding atmosphere through the forced air ventilation action of the micro fan 34. The FVS system of the power LED lighting assembly employs not only the micro fan 34 but also the air openings 21 in the LED PC board 20 and the air openings 33 in the heat sink enclosure 32 to maximize forced air ventilation.

Figure 13:
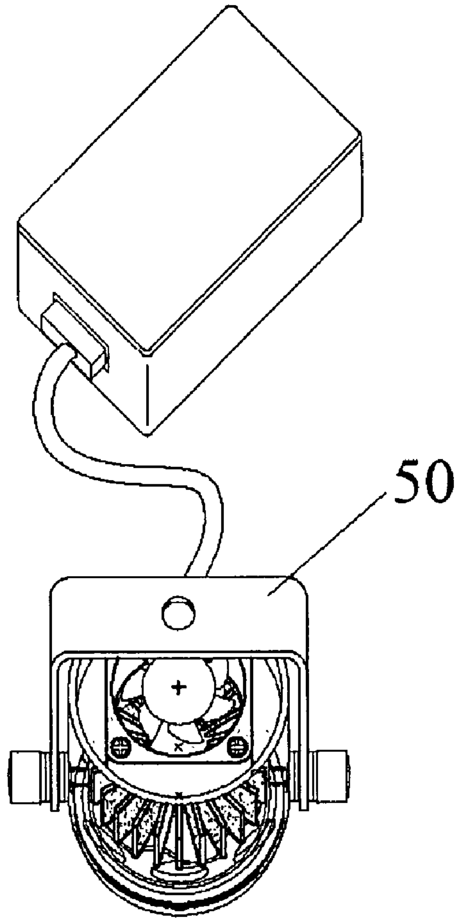
FIG. 13 is a perspective view of an application of the power LED lighting assembly.

FIG. 13 shows an application of the power LED lighting assembly according to the present invention. The power LED lighting assembly is movably secured on a wall or ceiling through the fixture hinge 50 so that a projecting surface of the power LED lighting assembly is variable in angle. The FVS system of the power LED lighting assembly will minimize heat damages to the wall or ceiling thanks to efficient heat release and cooling.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims. For example, while the LED PC board 20 is provided to carry the six power LEDs 10 in the illustrated embodiment of the present invention, it may be possible that only a single LED 10 on the LED board 20 may provide enough brightness for spot lighting.

What is claimed is:

1. A power LED lighting assembly comprising:

an LED board carrying a plurality of power LEDs mounted thereon, the LED board having air openings in the form of cutout portions around an outer edge of the board for air intake and ventilation;

a heat sink including a plurality of spaced apart fins that extend in a direction parallel to the LED board for release of heat and heated air to be generated from the LEDs;

a heat sink enclosure accommodating the heat sink and the LED board, wherein the LED board is positioned on the fins and wherein the heat sink enclosure has air openings for air ventilation;

a lens plate unit secured at a front side of the heat sink enclosure for focusing light emitted from the LEDs, the lens plate unit including a lens plate having a plurality of lenses each of which corresponding to each of the plurality of power LEDS respectively; and a micro fan for forced air circulation and ventilation within the heat sink enclosure having the heat sink and the LED board therein, wherein outside air is drawn into the interior of the heat sink enclosure for forced air ventilation and circulation, wherein air flows through the air openings in the enclosure as well as through the air openings in the LED board and the outtake of heated air flows between the fins prior to exiting through the fan.

2. The power LED lighting assembly of claim 1 wherein the micro fan is of a low profile.

3. The power LED lighting assembly of claim 1 further comprising a driver board carrying components for driving the LEDs and the micro fan.

4. The power LED lighting assembly of claim: 1 further comprising a fixture hinge for securing the power LED lighting assembly at a wall or ceiling.

5. The power LFD lighting assembly of claim 4 wherein a projecting area of the power LED lighting assembly is variable in angle.

6. The power LED lighting assembly of claim 1 wherein, the micro fan is turned on for heat release automatically on a temperature increase.

7. The power LED lighting assembly of claim 1 further comprising a temperature sensor installed to sense abnormal temperature increase in the assembly to adjust or reduce the volume of light and protect LEDs against abnormal high temperature.

8. The power LEI) lighting assembly of claim 1, wherein the lens plate unit includes a lens securing part.

9. The power LED lighting assembly of claim 8, wherein the lens securing part is one of a snout cone and a snout short.

10. A power LED lighting assembly comprising:

an LED board carrying a power LED mounted thereon, the LED board having air openings in the form of cutout portions around an outer edge of the board for air ventilation;

a heat sink including a plurality of spaced apart fins that extend in a direction parallel to the LED board for release of heat and heated air to be generated from the LED;

a heat sink enclosure for accommodating the heat sink and the LED board wherein the LED board is positioned on the fins and wherein the heat sink enclosure has air openings for air ventilation;

a lens plate unit including a lens secured at a front side of the heat sink enclosure for focusing light emitted from the LED a micro fan for forced air circulation and ventilation within the heat sink enclosure having the heat sink and the LED board therein, wherein outside air is drawn into the interior of the heat sink enclosure for forced air ventilation and circulation, wherein air flows through the air openings in the enclosure as well as through the air openings in the LED board and the outtake of heated air flows between the fins prior to exiting through the fan.

* * * * *